UNITED STATES PATENT OFFICE.

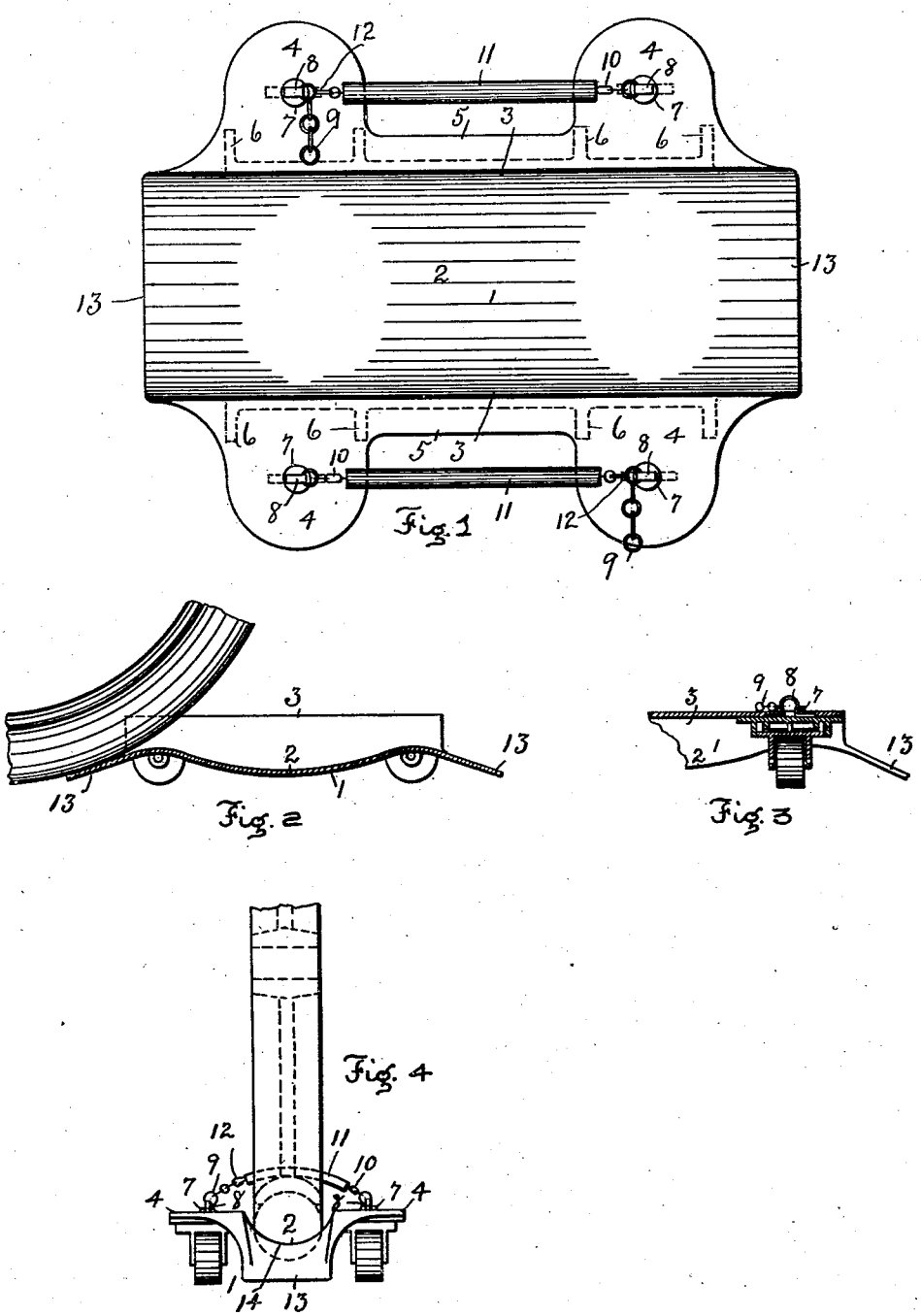

JOHN E. NORWOOD, OF BALTIMORE, MARYLAND.

CASTER.

No. 857,660.  Specification of Letters Patent.  Patented June 25, 1907.

Application filed August 20, 1906. Serial No. 331,250.

*To all whom it may concern:*

Be it known that I, JOHN E. NORWOOD, a citizen of the United States, residing at Baltimore, in the State of Maryland, have invented a new and useful Caster, of which the following is a specification.

This invention relates to casters and more particularly to vehicle casters and has for its object to provide a device of this nature in a plurality of which the wheels of a vehicle may be disposed and upon which a vehicle may be shifted from place to place, it being possible to move the vehicle in any direction.

Another object is to provide a caster of this kind, the major portion of which may be cast integral and which may be manufactured at a low figure.

Another object is to provide a caster so constructed that when the wheel of a vehicle is run thereupon, the caster will be held in position to prevent movement thereof until the operation of placing a wheel on the caster is completed.

Another object is to provide means to secure the caster to the wheel of the vehicle so that the latter may be moved forward or backward without being run off the caster.

Other objects and advantages will be apparent from the following description.

In the drawings forming part of this specification and in which like numerals of reference indicate similar parts in the several views, Figure 1 is a top plan view of the present caster. Fig. 2 is a longitudinal section of the caster, the device being shown with a wheel in position to be rolled thereupon. Fig. 3 is a detail sectional view of one of the rollers. Fig. 4 is an end view showing the vehicle wheel secured by the chain.

Referring now to the drawings, the present invention comprises a casting 1 including a concavo-convex bottom 2 and vertical longitudinally extending side walls 3, each of the latter having laterally extending horizontal ears 4 at their ends and an intermediate horizontal strengthening flange 5, these ears and flanges being further strengthened by the webs 6 which join these portions and the side walls 3 at the outer faces of the latter. On the upper surface of each of the ears 4 is a perforated boss 7, each of which is provided with an eye 8 extending therefrom. On one side of the caster one of the eyes 8 is provided with a plurality of round links 9 and the other eye on the same side of the caster is provided with a chain 10, covered with rubber 11, or other suitable material, and is provided with a snap-hook 12 on its free end adapted to catch into any one of the round links 9 to form a handle, as shown in Fig. 1. The eyes 8 on the opposite side of the caster are also provided with links 9 and chain 10 as described, but they are oppositely disposed from those described, that is to say, the round links 9 are at the opposite end of the caster. When the vehicle wheel is in the channel of the caster it may be secured therein by the chains as shown in Fig. 4. The rubber covering 11 of the chains serves to protect the hands when used as a handle, and to protect the wheel rim when used to secure the caster to the wheel.

The bottom 2 has its concave surface directed upwardly and this surface conforms approximately to the peripheral curvature of a vehicle wheel. At the ends of the bottom proper, there are leaves 13 which slant downwardly and terminate just short of a surface upon which the caster is disposed, the casting just described being supported upon rollers pivoted to the ears 4 and depending therefrom. These rollers are provided with suitable friction reducing devices to facilitate their rotation upon the pivotal connection thereof with the ears. The bottom 2, side walls 3, ears 4, flanges 5, webs 6, bosses 7, and leaves 13, are all cast integral and there is thus formed a body portion having a longitudinal channel 14 therein, this channel having a concave bottom.

By reference to Fig. 2, it will be seen that when a vehicle wheel is to be rolled into the present caster, it is brought against one of the leaves 13 and the weight of the wheel pressing down on the leaf will tilt the opposite end of the caster upwardly bringing the rollers at that end clear of the ground, while frictional engagement of the depressed leaf with the ground prevents movement of the caster when the wheel is rolled thereupon.

Having thus described my invention what I claim is:

1. A device of the class described, comprising a movable body portion having a channel formed therein and opening through its ends, said channel having the ends of its floor extending downwardly and beyond the said body portion, and means forming a handle on each side of the body portion and adapted to secure the caster to the vehicle wheel.

2. A device of the class described, comprising a movable body portion having a channel formed therein and opening through its ends, said channel having the ends of its floor extending downwardly and beyond the ends of the body portion in planes at an obtuse angle to each other, and means forming handles on each side of the body portion and adapted to secure the caster to the vehicle wheel.

3. A device of the class described, comprising a casting including a concavo-convex bottom and disposed with its concave side directed upwardly, vertical longitudinally extending side walls, laterally extending ears carried by the ends of the side walls at the upper portions thereof, downwardly slanted leaves carried by the bottom at its ends, said portions being formed integral, and supporting rollers carried by the ears.

4. A caster for vehicles comprising a cast body portion having a wheel-receiving channel therein, supporting rollers for the body portion, and downwardly inclined leaves carried by the body portion at the ends of its channel, and a chain on each side to form a handle and adapted to secure the wheel within the said channel.

5. A caster for vehicles comprising a cast body portion having a wheel-receiving channel therein, and two laterally extending ears at each end thereof, eyes projecting from said ears, a chain on each side of the body portion adapted to connect the two ears on the same side or two ears on opposite sides, supporting rollers for the body portion, and downwardly inclined leaves carried by the body portion at the ends of its channel.

JOHN E. NORWOOD.

Witnesses:
   CHAPIN A. FERGUSON,
   JEAN JOYER.